J. R. GUNN.
BRIDGE FOR SUPPORTING ELECTRIC FIXTURES.
APPLICATION FILED JUNE 7, 1915.
1,213,865.
Patented Jan. 30, 1917.
2 SHEETS—SHEET 2.
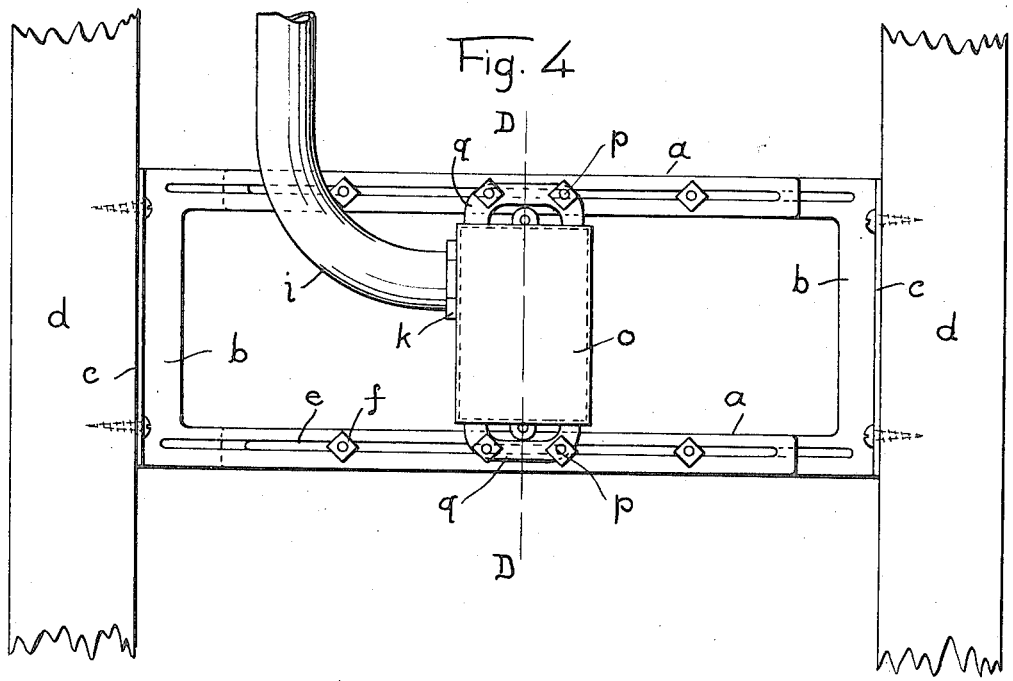
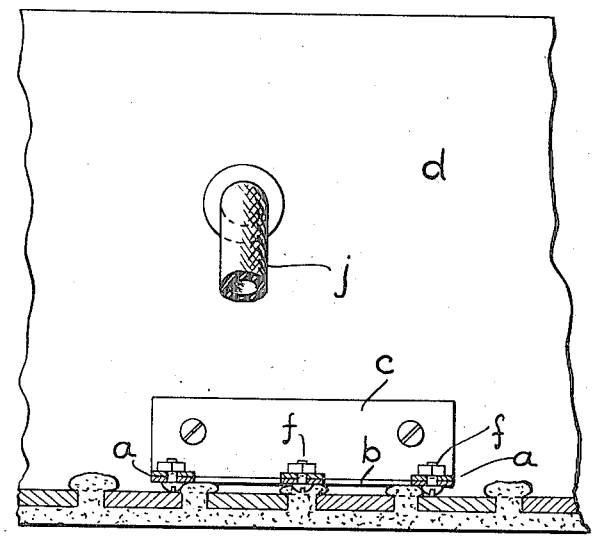
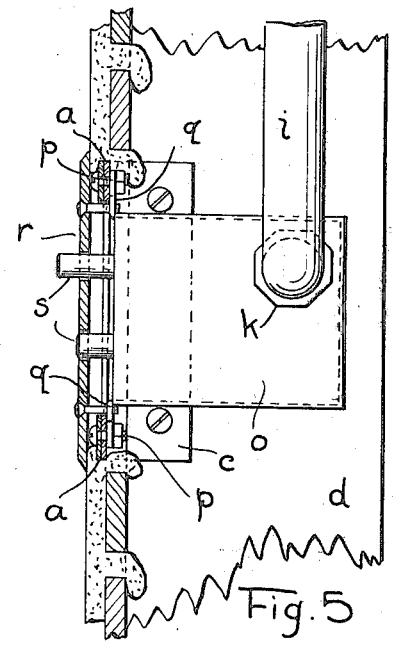
INVENTOR
John R. Gunn
BY
Raymond A. Parker
ATTORNEY

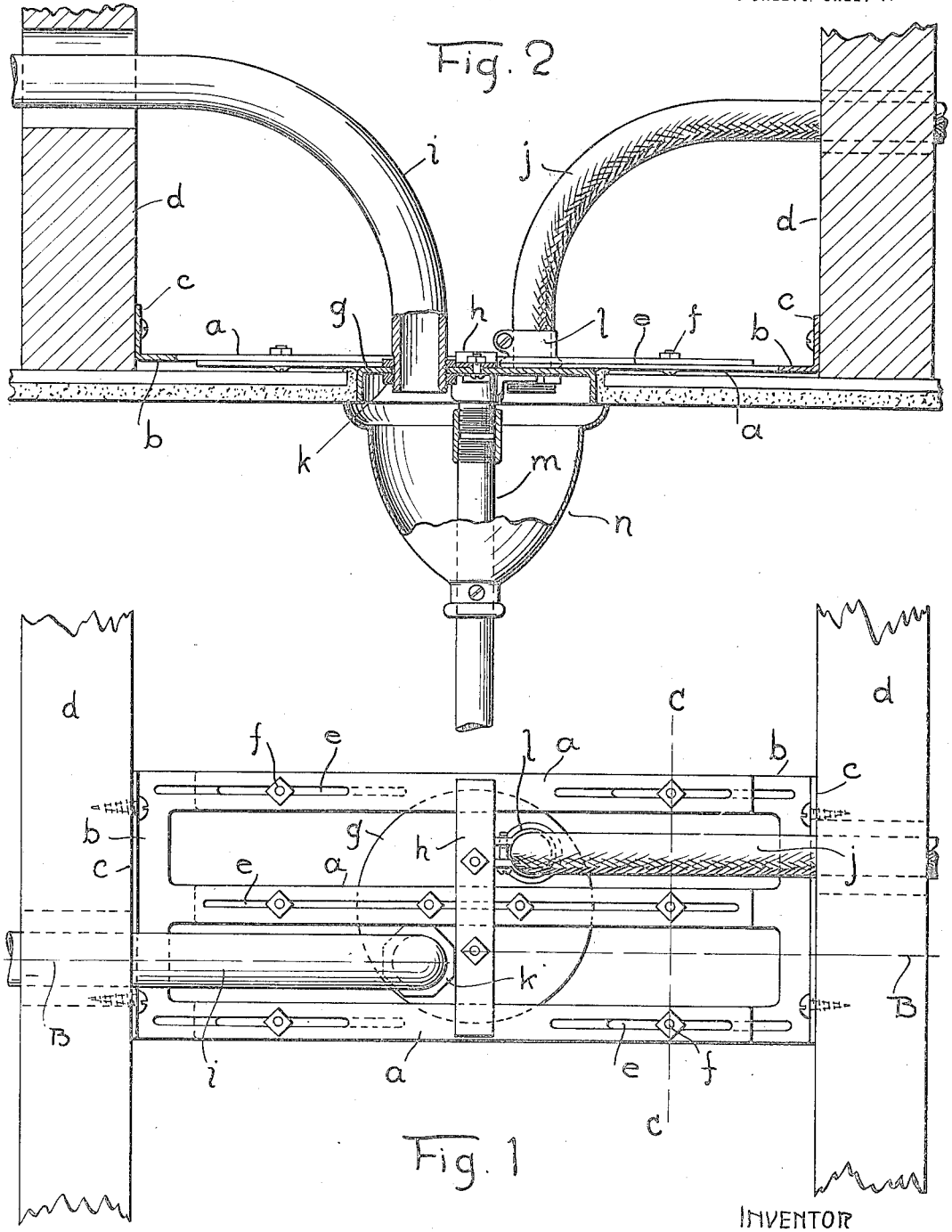

UNITED STATES PATENT OFFICE.

JOHN R. GUNN, OF DETROIT, MICHIGAN.

BRIDGE FOR SUPPORTING ELECTRIC FIXTURES.

1,213,865. Specification of Letters Patent. Patented Jan. 30, 1917.

Application filed June 7, 1915. Serial No. 32,566.

*To all whom it may concern:*

Be it known that I, JOHN R. GUNN, a citizen of the United States, residing at Detroit, county of Wayne, State of Michigan, have invented a certain new and useful Improvement in Bridges for Supporting Electric Fixtures, and declare the following to be a full, clear, and exact description of the same, such as will enable others skilled in the art to which it pertains to make and use the same, reference being had to the accompanying drawings, which form a part of this specification.

This invention relates to a bridge for supporting outlet boxes from joists or studs, and has for its object a bridge which may accommodate itself to the varying spaces that are found between joists and studs.

In the drawings,—Figure 1 is a top plan view of the adjustable bridge used to support the ceiling box and an electric lamp fixture. Fig. 2 is a vertical section on the line B—B of Fig. 1. Fig. 3 is a vertical cross section on the line C—C of Fig. 1. Fig. 4 is a rear view of the adjustable bridge used to support a switch box in the side wall of a building. Fig. 5 is a vertical cross section on the line D—D of Fig. 4.

The bridge comprises preferably a stamping in the form of straps $a$ united at their ends by the cross bar portions $b$ which are bent up at their longitudinal centers to form flanges $c$ which may be secured by nails or screws to the joists $d$. These flanges form angle metal cross-bars.

It is preferable to make the bridge in the form of a plurality of sets of straps which are intended to coincide one above the other, but which are adjustable lengthwise by reason of the slots $e$ and bolts and nuts $f$. Each outside pair of coinciding straps is preferably provided with two pairs of slots, the individual members of which partially register as shown in the drawings. The central pair of straps is, however, provided with only one pair of partially registering slots, which, however, are longer. This allows the fastening of the ceiling or outlet box at any desired point along the bridge as the ceiling box $g$ is secured to the center pair of straps by bolts and nuts. It is supported upon the outside pairs of straps by reason of having bolted to it a cross strip $h$ forming extensions which rest on top of the two outside pairs of straps and are slidable therealong to accord with any new adjustment made by the bolts and nuts to engage with the central pair of straps.

A metal wire conduit $i$ is shown running into one side of the ceiling box, and a flexible conduit $j$ is shown running into the other side of the ceiling box $g$. The metal conduit is fastened to the ceiling box by a pair of nuts $k$, and the flexible conduit is fastened to the ceiling box $g$ by a ring clamp $l$.

The electric lamp chandelier is designated $m$ and the thimble which covers the joint between the chandelier and the ceiling box is lettered $n$.

When my bridge is used to support an outlet box in the form of a switch box as shown in Figs. 4 and 5, the center pair of straps is omitted as it will be evident it has not as great a bending strain upon the straps when the bridge is set up edgewise. The same adjustable features may be utilized in the side wall bridge as in the ceiling bridge by the employment of slots and bolts and nuts. However, it is preferable to employ only one set of slots for each pair of straps so that the switch box $o$ may be adjustably securable to the outside pairs of straps by bolts and nuts $p$ passed through the extensions $q$ on the switch box. The switch buttons $s$ protrude through the face plate $r$.

It has been quite customary heretofore to employ wooden blocks to support the fixtures and switch boxes from ceilings and walls respectively. These blocks have to be cut or fitted to the particular spacing between the joists and inasmuch as the wooden blocks provide inflammable material about the ceiling box, it will be evident that the employment of a metal bridge such as I have described is an added protection against possible fire causes. These bridges may be quickly and easily adjusted to any spacing employed between the joists or any irregularity in such spacings, and hence can be quickly and easily placed.

What I claim is:

1. A bridge and outlet box of the class described, having in combination, a pair of bridge portions each having at each end an angle metal cross-bar and each provided with a plurality of slotted straps integrally connected together by the angle metal cross-bar, the said straps of the two bridge portions adapted to be overlapped and secured in selectable positions of overlap, and an outlet box provided with extensions supported on the outside straps in selectable positions.

2. A bridge and ceiling box of the class described, having in combination, a pair of bridge portions provided at their outside ends with cross bars which may be secured to the joists and having a plurality of slotted straps, the said straps of the two bridge portions being adapted to coincide, bolts and nuts for securing the bridge portions in various positions of adjustment by passing through the said slots, a ceiling box, bolts and nuts for securing the ceiling box at varying positions along the center pair of coinciding straps and passing through the slots in the same, and a cross strip secured to the top of the ceiling box and resting at each end on the outside pairs of straps.

In testimony whereof, I sign this specification.

JOHN R. GUNN.